United States Patent [19]

Schlatter et al.

[11] Patent Number: 5,067,606
[45] Date of Patent: Nov. 26, 1991

[54] CLAMP ACTUATING SYSTEM FOR A CONVEYOR CARRIED CLAMPING FRAME

[75] Inventors: Howard M. Schlatter, Rochester Hills; Lawrence A. Wisne, Farmington Hills, both of Mich.

[73] Assignee: Progressive Tool & Industries Co., Southfield, Mich.

[21] Appl. No.: 643,533

[22] Filed: Jan. 18, 1991

[51] Int. Cl.$^5$ .............................................. B65G 29/00
[52] U.S. Cl. ............................ 198/465.1; 198/465.3
[58] Field of Search ............... 198/465.1, 465.2, 465.3, 198/803.01, 803.2, 803.3; 29/33 P

[56] References Cited

U.S. PATENT DOCUMENTS

| | | | |
|---|---|---|---|
| 1,471,831 | 10/1923 | Corset . | |
| 2,107,184 | 2/1938 | Lasker | 74/501 |
| 2,130,578 | 9/1938 | Baker | 123/108 |
| 2,160,113 | 5/1939 | Anderson | 74/501 |
| 2,595,922 | 5/1952 | Camnasio | 66/154 |
| 3,183,301 | 5/1965 | Kompanek | 174/108 |
| 3,854,889 | 12/1974 | Lemelson | 198/465.1 X |
| 4,502,589 | 3/1985 | Fichtner | 198/803.11 X |
| 4,557,371 | 12/1985 | Yonezawa | 198/803.3 X |
| 4,723,767 | 2/1988 | McPherson | 269/32 |
| 5,018,617 | 5/1991 | Miyata et al. | 198/465.1 X |

FOREIGN PATENT DOCUMENTS 2587638 9/1985 France .
2103119 2/1983 United Kingdom .

Primary Examiner—Joseph E. Valenza
Assistant Examiner—Cheryl L. Gastineau
Attorney, Agent, or Firm—Basile and Hanlon

[57] ABSTRACT

A plurality of clamps carried on an article support frame movable on a conveyor between successive work stations are mechanically actuated by push/pull cable assemblies connected between each clamp and a common actuator mounted on the support frame. A movable actuator member is driven by a drive screw to actuate the clamps via the cable assemblies and the threaded interconnection between the screw and actuator member locks the actuator member in its last actuated position to lock the clamps in their last actuated positions. A reversible rotary power drive may be drivingly coupled to the screw when the support frame is at a predetermined position at a work station.

20 Claims, 5 Drawing Sheets

CLAMP ACTUATING SYSTEM FOR A CONVEYOR CARRIED CLAMPING FRAME

BACKGROUND OF THE INVENTION

The present invention is directed to a clamping system in which a plurality of workpiece holding clamps are mounted upon a clamping frame which is in turn mounted upon a conveyor to convey a workpiece clamped on the frame to a series of successive work stations at which various operations are performed upon the workpiece. The invention is especially concerned with the handling of relatively large panel type workpieces, such as the major body and door panels which are to be subsequently assembled into an automotive vehicle body.

The initial step in the construction of an automotive vehicle body is the stamping of various panels, such as body side panels, the floor panel, and the door panels from sheet metal. Before these various stamped panels are assembled into the vehicle body, additional components such as panel reinforcements, mounting brackets, etc., are welded in place on the panel and other components, such as door hinges or, in the case of door panels, door latch and window operating mechanisms, are assembled onto the panel by conveying the panel to each of a series of successive work stations at which various work operations are performed upon the panel. For production efficiency, it is desired that the panel be initially located at an accurately predetermined position at each work station by the conveying or transfer system. The size and irregular shape of the typical panel is such that in order to fixedly support the panel in a predetermined position, the panel must be engaged by clamps at several different locations on the panel and the clamps in turn must be mounted at fixed locations upon a rigid clamping frame carried by the conveyor or transfer device.

All such systems must include some arrangement for actuating the clamps at a loading station where the panel is initially loaded and clamped to the clamping frame and a second clamp actuating arrangement at the final station on the production line where the completed panel is unclamped and unloaded from its clamping frame. Optimum production efficiency is achieved where all of the various work operations to be performed on the panel can be performed while the panel remains clamped to its clamping frame. However, it is not always possible to design the clamping frame and to locate the panel engaging clamps in a manner such that access to all regions of the panels upon which work operations are to be performed is possible. In these cases, it is necessary to unclamp and transfer the panel from its clamping frame to a fixture permanently located at the work station for performance of the work operation and to then reload and reclamp the panel upon its clamping frame for transfer to the next work station. Rapid loading or unloading of the panel from or to the frame requires that several clamps, typically irregularly spaced around the periphery of a relatively large irregularly shaped panel, be substantially simultaneously actuated to clamp or to unclamp the panel, and this objective may be best achieved by actuating the clamps from a common power source. However, the clamps are mounted upon a clamping frame which must be conveyed along a production line of substantial length with the individual clamps maintained in their clamping position at least while the frame is moving along the production line. Clamps of the type employed typically are actuated by a relatively short stroke pneumatic motor mounted directly upon the clamp, and the maintaining of a connection between an air pressure source and a plurality of individual pneumatic motors moving along a production line of substantial length presents some obvious problems.

The present invention is directed to a clamp actuating system by means of which a plurality of clamps mounted upon a clamping frame movable along a conveyor line may be simultaneously or substantially simultaneously power actuated to their clamping position or to their release position and be positively maintained in the position to which they were last actuated without requiring continued application of power to the clamp actuator.

SUMMARY OF THE INVENTION

In accordance with the present invention, a plurality of individual clamps are mounted at locations upon a rigid clamping frame determined by the configuration of the workpiece or panel which is to be releasably clamped upon the frame by the clamps. The individual clamps are of a conventional commercially available construction in which a clamping member pivotally mounted upon the clamp housing or frame is coupled by linkage or toggle arrangement to a shifting member mounted in the housing or frame for reciprocatory movement along a straight line path. Movement of the shifting member in one direction pivots the clamp member to its release position, movement of the shifting member in the opposite direction is employed to drive the clamp member to its clamping position.

The shifting member of each clamp is coupled via a push/pull cable assembly to a common actuator member mounted for reciprocatory movement within an actuator housing or frame fixedly located with respect to the clamping frame. Each push/pull cable assembly includes an elongate flexible sheath fixed at one end to the actuator housing and fixed at its other end to one of the clamp housings. A flexible wire slidably received within the sheath projects from opposite ends of the sheath and is coupled at one end to the actuating member and at its other end to the shifting member of the clamp. Reciprocation of the actuator member within its housing thus causes a corresponding reciprocation of the shifting members of all of the individual clamps so that movement of the actuating member in one direction will simultaneously pivot all of the clamping members toward their release position and shifting movement of the actuator member in the opposite direction will shift the clamps members to their respective clamping positions.

The actuator member is driven in movement within its housing by a drive screw rotatably mounted within the housing and threadably received within a nut carried by the actuator member. When the screw is rotated, the actuator member will be driven axially along the screw in a direction dependent on the direction of rotation of the screw. When the screw is not being rotated, the threaded interconnection between the screw and the nut on the actuator will positively hold the actuator member against movement axially of the screw, and thus lock all of the clamp members against movement via the wires of the respective push/pull cable assemblies.

One end of the drive screw projects from the actuator housing. At each station along the production line at which it is necessary to actuate the clamps, a reversible rotary power drive is mounted at the work station at a location such that when the clamping frame is at the work station, the shaft of the reversible drive is axially aligned with the projecting end of the drive screw. The drive shaft of the reversible drive may be selectively rotatably coupled to or disengaged from the projecting end of the drive screw so that operation of the reversible drive may rotate the drive screw.

The configuration of the clamping frames is, to some extent, determined by the size and configuration of the panel to be handled by the frame. Thus, from time to time, such as the annual model changeover, new sets of clamping frames may be required, while the conveying system or transfer device is a permanent installation. The conveying system thus will preferably include a plurality of like carriers, which are a permanent part of the conveying system, and these carriers will be provided with some means for detachably mounting a clamping frame upon the carrier. Most automotive assembly plants are set up to assemble two or more models of vehicles upon an assembly line with different models intermixed in succession in a sequence determined by production scheduling. Thus, in order to match the scheduling of the main production line, the panel assembly lines must also be capable of processing two or more different types of panels. In many instances, the conveying system will include a storage area or loop where clamping frames designed to handle panels for one particular vehicle model may be temporarily stored while clamping frames which handle panels for another vehicle model are in use on the panel assembly line. The conveying system will typically include arrangements by which the clamping frames may be selectively transferred between the active and storage portions of the transfer system.

Other objects and features of the invention will become apparent by reference to the following specification and to the drawings.

BRIEF DESCRIPTION OF THE DRAWINGS

In FIGS. 1 an 2, there are shown simplified views of a body side panel conveying system designated generally 10 which is employed to transport sheet metal panels such as the panel P (FIG. 1) to and from a series of work stations such as W where the panel P is temporarily transferred to a stationary work support designated generally 12 to have a particular work or assembly operation performed upon the panel. Such a conveying system is disclosed and described in detail in a commonly owned copending application Ser. No. 07/464,147, filed Jan. 12, 1990 to which reference may be had for further details of the system.

Figure 1:
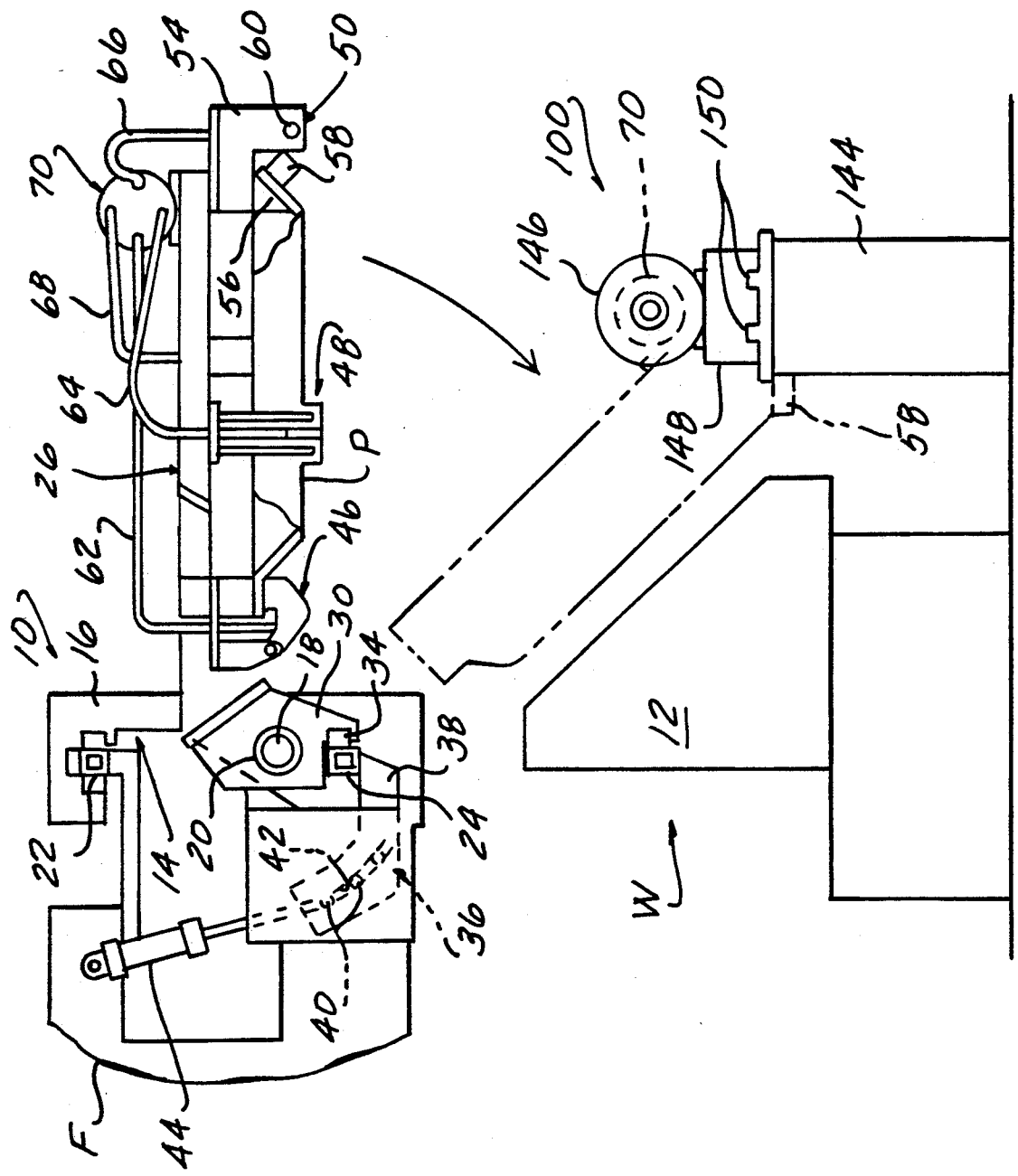
FIG. 1 is a simplified end view, with certain parts broken away or shown in section, of an article handling system embodying the present invention.

In brief, the conveying system includes a carrier designated generally 14 which includes a pair of spaced end plates 16 fixedly interconnected with each other by a fixed shaft 18 upon which is rotatably journaled an elongate sleeve 20. The carriage 14 is mounted for movement along upper and lower conveyor rails 22, 24 in intermittent step by step movement in which the carrier 14 is advanced from one work station to the next and stopped upon arrival at the next work station. A support frame designated generally 26 is fixedly secured upon the sleeve 20 as by mounting brackets 28, 30 and 32 (FIG. 2).

During movement between work stations, the support frame 26 is maintained in an elevated generally horizontal conveying position shown in full line in FIG. 1 by the engagement of rollers such as 34 (FIG. 1) with the outer side surface of lower conveyor rail 24. The offset center of gravity of the support frame assembly 26 gravitationally urges the support frame in clockwise movement about shaft 18 as viewed in FIG. 1 and the engagement of roller 34 with the lower conveyor rail 24 prevents this clockwise movement of the support frame from its conveying position upon the carrier shaft 18.

As described in greater detail in the aforementioned application Ser. No. 07/464,147, at each work station, a relatively short section of lower rail 24 is mounted upon a manipulator designated generally 36 for movement relative to the fixed portions of rail 24. This relatively short moveable rail section is fixedly mounted upon a manipulator frame 38 which is supported as by rollers 40 for movement along an arcuate track 42 whose center of curvature is coincident with the axis of shaft 18. A pneumatic motor coupled between the fixed frame F of the conveyor and manipulator frame 38 moves the manipulator along the arcuate path defined by the tracks 42. When the piston rod of motor 44 is fully extended, the relatively short movable section of track 24 is aligned with the fixed sections of the track. When the support frame 26 arrives at a work station, the rollers 34 which maintain the support frame in the elevated conveying position shown in FIG. 1 move from the fixed sections of track 24 into engagement with the relatively short movable section of the track. At this time, actuation of motor 44 to retract its piston rod shifts the movable track section in clockwise movement as viewd in FIG. 1 about the axis of shaft 18 as the manipulator frame 38 moves upwardly along tracks 42, and thus permits support frame 26 to swing downwardly in clockwise rotation about shaft 18 to the broken line transfer position indicated in FIG. 1. At this time, the panel P is located closely adjacent the stationary work frame 12, and upon release of various clamps such as clamps 46, 48, 50 and 52, the panel may be transferred to the stationary work support. Upon transfer of support of the panel to the stationary work frame 12, motor 44 is again actuated to return support frame 26 to the elevated full line position shown in FIG. 1 to provide free access to the panel for the performance of a work operation. Upon completion of the work operation, the support frame 26 is again swung downwardly to the broken line transfer position of FIG. 1 by operation of the manipulator, the panel is reclamped to the support frame, and the support frame is then elevated back to its generally horizontal conveying position for movement to the next work station.

Figure 2:
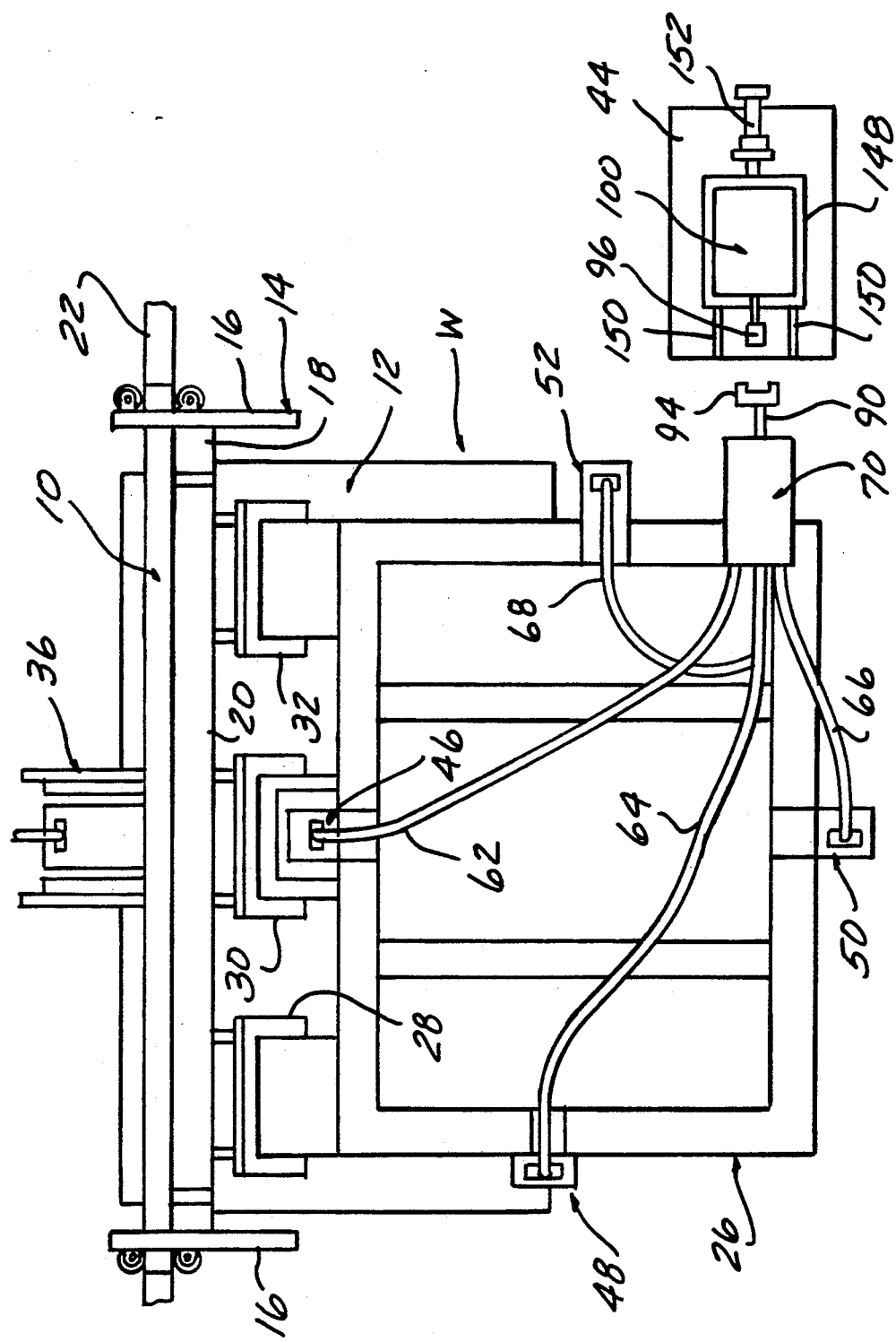
FIG. 2 is a simplified top plan view of the apparatus shown in FIG. 1, with certain parts omitted.

In the system as shown in FIGS. 1 and 2, the support frame 26 is illustrated in simplified form as an open rectangular frame work and four clamps 46, 48, 50 and 52 are shown as being employed to clamp the panel P at one side of support frame 26. In practice, the configuration of the support frame and the number and locations of clamps mounted on the support frame will be determined by the configuration of the panel P which is to be handled by the support frame. For purposes of the present application, it may be assumed the panel P is of a generally rectangular configuration generally matching that of the support frame. The clamps 46, 48, 50 and 52 may take any of several forms of commercially available clamps of the type designed to be actuated by the piston rod of a pneumatic motor. Examples of clamps of this general type are disclosed in U.S. Pat. Nos. 3,618,931 and 4,396,183, for example. Referring to the clamp 50 of FIG. 1, for example, each clamp typically will include a housing or frame 54 fixedly mounted upon support frame 26 and a fixed pad 56. A movable clamp member 58 is pivotally mounted on frame 54 as at 60 for movement between a clamping position in which a portion of the panel P is clamped between member 58 and pad 56 and a released position in which the movable clamp member 58 is pivoted in a counterclockwise direction as viewed in FIG. 1 to a position well clear of panel P. Typically, as disclosed in U.S. Pat. Nos. 3,618,931 and 4,396,183, the pivoting clamp member 58 of the clamp is coupled by a linkage to an actuator which moves in a straight line path, the straight line movement being transformed by the linkage into pivotal movement of the pivoted clamp member 58.

In that the support frame 26 is movable along a horizontal path defined by the conveyor rails 22, 24 and is also capable of pivotal movement about shaft 18 as indicated in FIG. 1, it is not practical to employ pneumatic motors for actuating the various clamps carried by the support frame. The clamps must be maintained in their clamping position during transfer of the panel from one work station to the next and must be released and then reclamped at the working station. Because the support frame must move to clear the panel between the release and reclamping steps, the system which actuates the clamps must be capable of maintaining the clamps in either their clamping or released positions while disconnected from a power source. The present invention achieves this last result by an actuating system which positively mechanically retains the clamps in the positions to which they were last actuated.

In accordance with the present invention, each of the various clamps is actuated by a push/pull cable or Bowden wire assembly such as 62, 64, 66, 68 (FIGS. 1 and 2) which extends from the individual clamp to a common actuating device 70 mounted upon support frame 26. Each of the push/pull cable assemblies includes an elongate flexible wire slidably received within a flexible sheath with the opposite ends of the sheath being fixedly secured to fixed portions of the clamp and to actuator 70. The internal wire projects beyond both ends of the sheath, with one end of the wire being coupled to a moveable member of actuator 70 and the opposite end of the wire being fixedly secured to the clamp actuating mechanism. In the case of those commercially available clamps designed to be actuated by the piston rod of a pneumatic motor, the push/pull wire may have one end secured directly to that member of the clamp actuator which was intended to be coupled to the piston rod of the pneumatic actuating motor.

Figure 3:
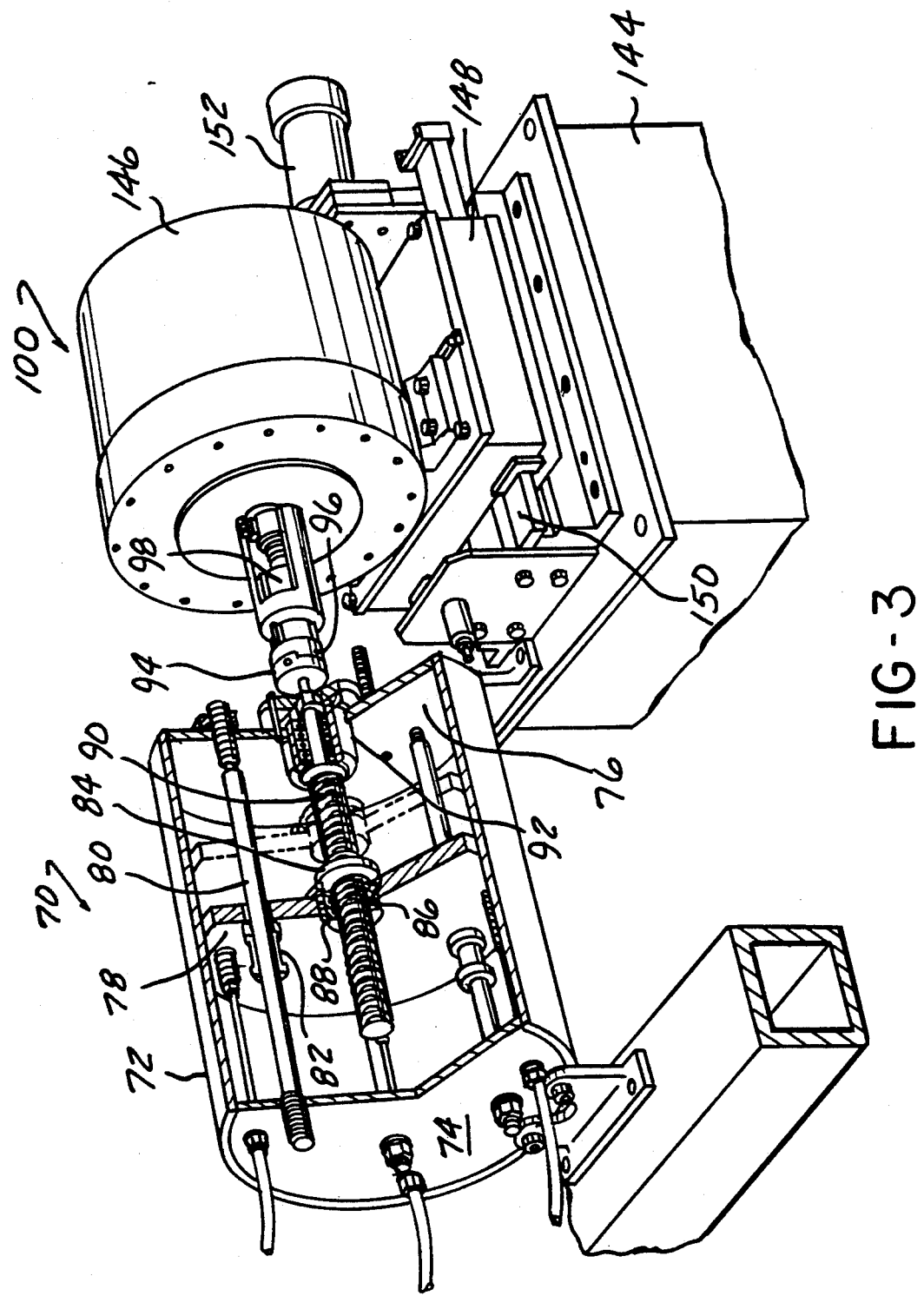
FIG. 3 is a perspective view, partially in cross section, with certain parts broken away showing a clamp actuating mechanism embodying the present invention.

Referring now particularly to FIG. 3, actuator 70 include a hollow cylindrical housing 72 having end walls 74, 76 fixedly mounted at its opposite ends. Within housing 70, a piston like actuating member 78 is slidably received for movement axially of the cylinder and is restrained against rotary movement relative to the cylinder as by guide rods 80 slidably received in bushings such as 82 fixedly mounted on member 78. An internally threaded nut 84 is received within a threaded bore 86 through member 78 and is rotatively locked to member 78 as by a screw 88. A drive screw 90 is threadably received within nut 80 and is mounted for rotation within a support bearing 92 fixedly mounted in and projecting through end wall 76. Bearing 92 restrains drive screw 90 against axial movement relative to the housing. A coupling member 94 is fixedly mounted on the projecting end of drive screw 90 for engagement, in a manner to be described below, with a mating coupling member 96 carried by the drive shaft of a reversible drive motor 100.

Figure 4:
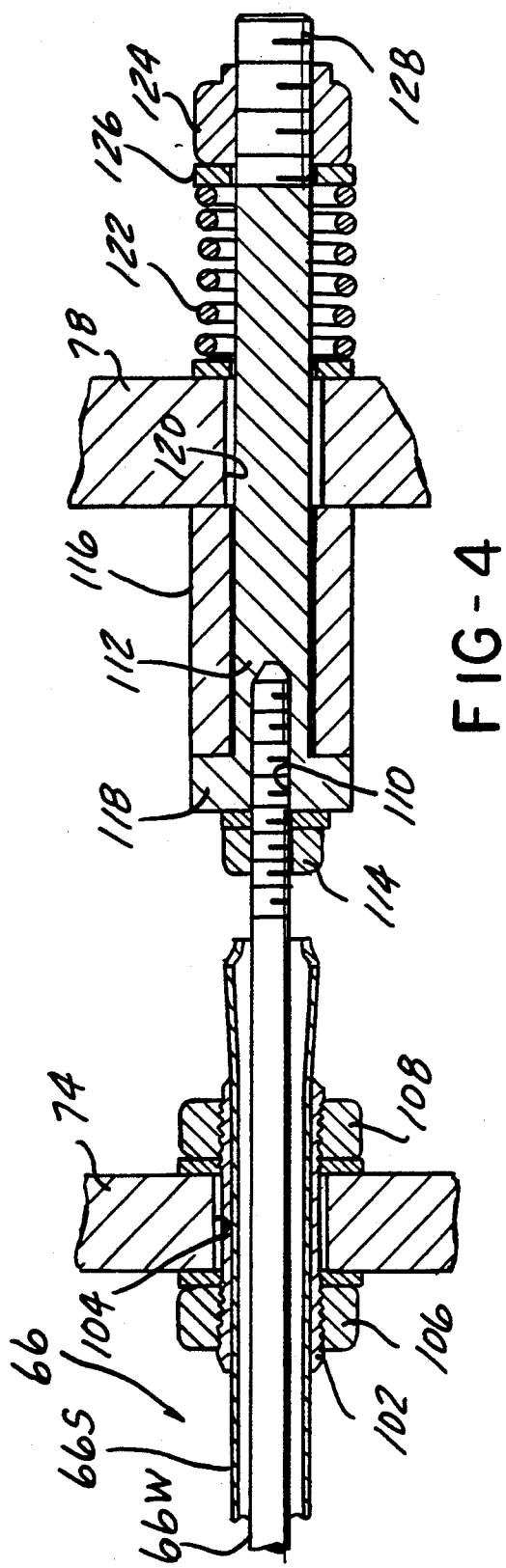
FIG. 4 is a detailed cross sectional view showing details of the coupling of a push/pull cable assembly to the actuating mechanism of the present invention.

One form of connecting the various push/pull cable assemblies to actuator 70 is shown in FIG. 4. As stated above, a push/pull cable assembly, such as the assembly 66 includes, as shown in FIG. 4, an external hollow tubular sheath 66S of flexible material and a wire 66W slidably received within the sheath. One end of the sheath 66S is fixedly anchored to end wall 74 of the actuator by a hollow tubular adapter 102 fixedly secured to the exterior of sheath 66 near its end. Adapter 102 is received within a bore 104 through end wall 74 and may be fixedly secured to the end wall as by nuts 106, 108 threaded onto the opposite ends of adapter 102 at opposite sides of end wall 74. Wire 66W projects beyond the end of sheath 66S and is threadably received within a tapped bore 110 in one end of a coupling member 112 and retained against rotation relative to coupling member 112 as by a lock nut 114. A hollow tubular spacer 116 is engaged between one face of actuator member 78 and a radially projecting flange 118 on coupling member 112. Coupling member 112 projects through a bore 120 through actuating member 78 and a compression spring 122 is engaged between the opposite side of actuator member 78 and a nut and washer 126 mounted on the threaded end 128 of coupling member 118.

In the arrangement shown in FIG. 4, the force exerted by compression spring 122 is proportional to the amount by which the spring is compressed from its normal relaxed length. The displacement of actuating member 78 is determined with a fair degree of precision by the threaded drive connection between member 78 and drive screw 90 and, if movement of actuating member 78 to the right as viewed in FIG. 4 is utilized to move the clamp member connected to wire 66W to its clamped position, the length of wire 66W may be chosen such that the clamp member first engages the workpiece when actuating member 78 is at some predetermined distance from the end of its actuating stroke. With the clamp engaged, wire 66W can no longer move to the right with actuator member 78 and further movement of member 78 to the right will result in compressing spring 122 against the now stationary nut 124. As spring 122 is compressed, the force exerts against nut 124, and hence wire 66W will increase linearly with the rightward movement of actuator member 78, and the total clamping force applied by the clamp member at the conclusion of rightward movement of actuator member 78 may be regulated with a fair degree of accuracy. By employing springs of different spring characteristics with the various cable assemblies, the clamping forces applied by the various clamps may be individually selected.

Figure 5:
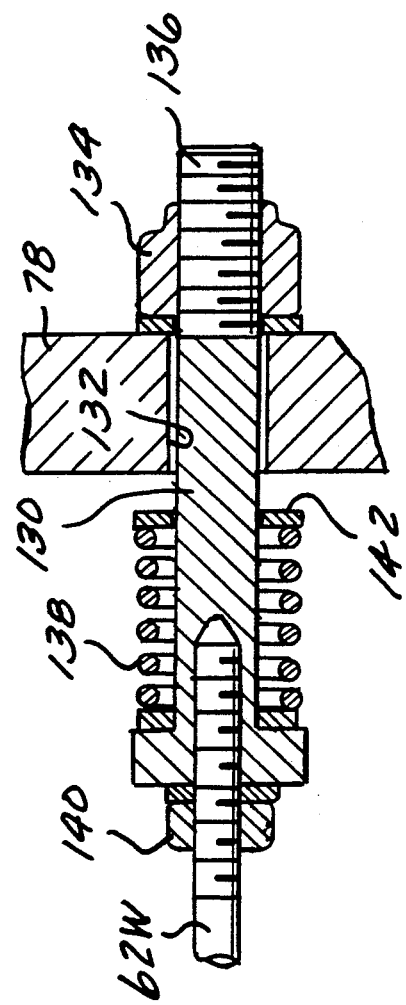
FIG. 5 is a detailed cross sectional view showing an alternative form of coupling between the push/pull cable wire and actuating member.

Another form of coupling between a wire such as 62W and actuator member 78 is shown in FIG. 5. In the FIG. 5 arrangement, the wire, such as 62W, is threadably attached to a coupling member 130 as in the previously described embodiment. Again, the coupling member projects freely through a bore 132 through the actuating member and a nut 134 is threadably received on the projecting end 136 of the coupling member. A compression spring is received on coupling member 130 between a flange 140 on the coupling member and the facing side of actuating member 78. In the arrangement of FIG. 5, the position of the nut 134 and the relaxed length of spring 138 are such that there is a predetermined amount of lost motion in the coupling between wire 62W and actuator member 78. Although FIG. 5 shows both nut 134 and spring washer 142 spaced from the respective adjacent sides of actuator member 78, normally when actuator member 78 is at one end of its stroke, either nut 134 or washer 142 will be engaged with the adjacent side of member 78. If, for example, member 78 were at its right hand end limit of travel, it would be engaged with nut 134. Upon movement of actuator member 78 to the left from its right hand end limit of travel, actuator member 78 would move a predetermined distance before contacting spring washer 142, and during this initial stage of the movement of member 78, no movement of member 78 would be transmitted to wire 62W. By selecting the amount of lost motion for one wire to be greater than the amount of lost motion established for another wire, the sequence in which the clamps are opened or closed can be selected as desired.

Referring now particularly to FIGS. 1 and 2, actuator 70 is mounted upon and moves with support frame 26. The actuator drive 100 is located on a fixed frame 144 at the work station W, and actuator 70 and actuator drive 100 are located in operative alignment with each other only when support frame 26 is in the broken line transfer position shown in FIG. 1. Referring now particularly to FIG. 3, a reversible drive motor 146 is fixedly mounted upon a slide 148 which is, in turn, mounted upon the fixed frame 144 for reciprocatory movement along tracks 150 fixedly mounted upon fixed frame 144. A pneumatic motor 152 is employed to drive slide 148 back and forth along tracks 150 between an operating position shown in FIG. 3 and a retracted position shown in FIG. 2.

With slide 148 in the retracted position shown in FIG. 2, upon movement of support frame 26 to its transfer position, the coupling 94 on drive screw 90 will be moved into coaxial alignment with the coupling 96 on the shaft of motor 100, but with slide 148 in its retracted position, the two coupling members 94, 96 will be axially spaced from each other and completely disengaged. Upon actuation of pneumatic motor 152 to drive slide 148 to its operating position, the two couplings 94, 96 will become engaged as shown in FIG. 3, so that actuation of motor 146 will drive screw 90 in rotation to shift actuating member 78 to manipulate the various clamps. Upon subsequent disengagement of coupling 96 from coupling 94 by withdrawal of slide 148 back to its retracted position, actuating member 78 will be locked against axial displacement from its last actuated position by its threaded interconnection with drive screw 90.

Figure 6:
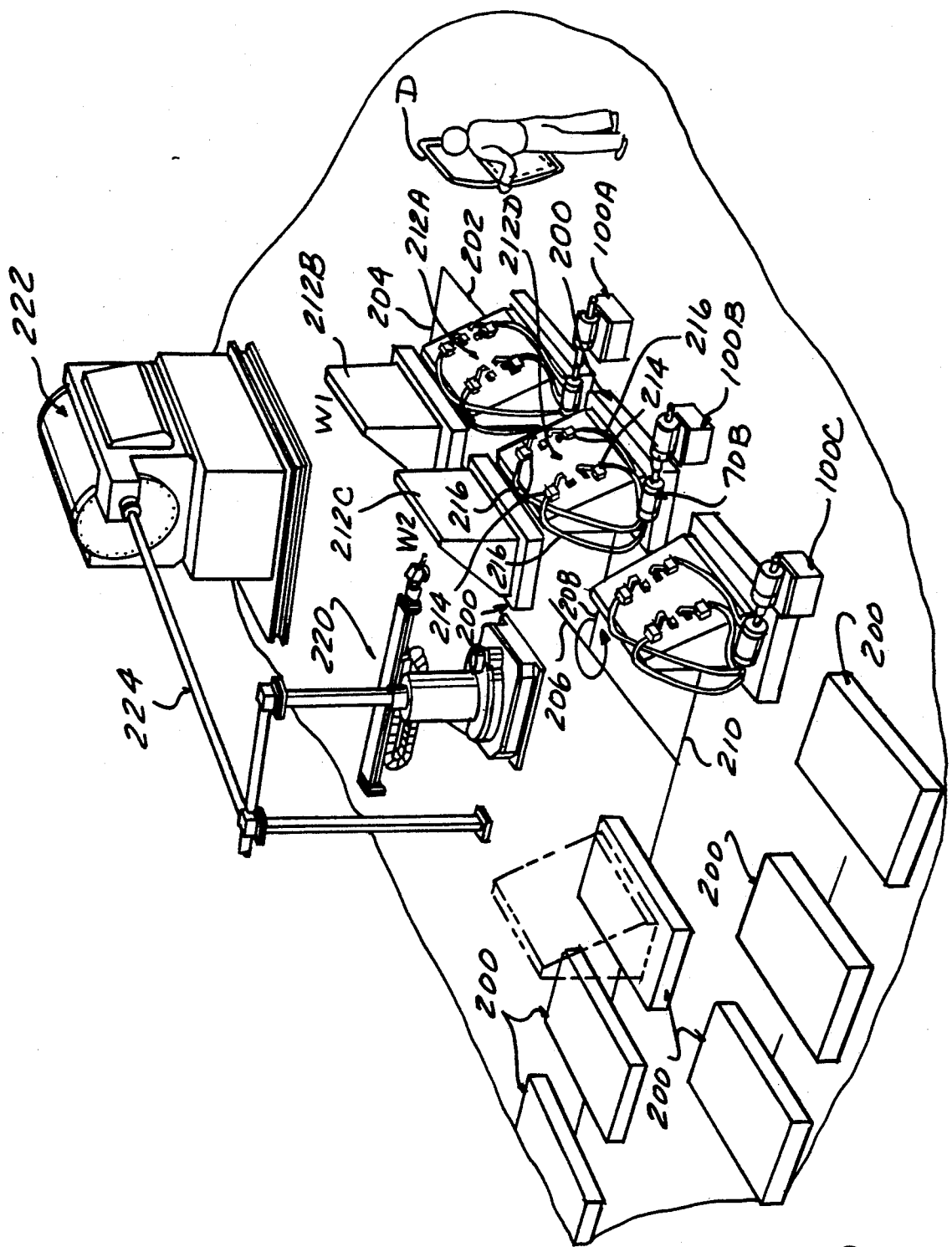
FIG. 6 is a simplified perspective view of a system embodying the present invention utilized for working upon vehicle door panels.

In FIG. 6, there is shown a simplified view of another form of panel handling system in which the workpiece, which in FIG. 6 may be assumed to be a vehicle door panel, remains clamped to its clamping frame while various work operations are performed upon the panel at various work stations. In FIG. 6, the production line is extremely foreshortened in that it includes only a loading station L, an unloading station UL and two work stations W1, W2, whereas a typical line might include several additional work stations.

The system of FIG. 6 includes a conveyor system which takes the form of a plurality of like carriers or pallets 200 which are coupled to an under the floor power driven conveyor system for movement along path sections schematically indicated by the lines 202, 204, 206, 208 and 210. Conveyors of this type are well known and may take any of several forms. On pallets 200A, 200B, 200C and 200D, clamping frames 212A, 212B, 212C and 212D are fixedly, but detachably, mounted. The four pallets 200A, 200B, 200C and 200D are located respectively at loading station L, unloading station UL and work stations W1, W2 on a production line portion of the system constituted by a rectangular loop path constituted by the line paths 202, 204, 206 and 208.

Each of the clamping frames 212A-D includes a plurality of clamps 214 mounted at fixed locations upon the clamping frame determined by the configuration of the panel which is to be clamped upon the frame. As in the previously described embodiment, each of the various clamps 214 is coupled by a push/pull cable assembly 216 to a common actuator 70A mounted upon the clamping frame. The various clamps 214, push/pull cable assemblies 216 and actuator 70A are similar to the clamps 46, 48, etc., cable assemblies 62, 64, etc., and actuator 70 respectively of the previously described embodiment. Reversible actuator drives 100A and 100B are mounted upon the clamp floor respectively at a loading station and an unloading station L and UL respectively. The actuator drives 100A and 100B are similar in construction and operation to the actuator drive 100 described above in connection with the system of FIGS. 1-5.

In the system shown in FIG. 6, the clamps on clamping frame 212A located at loading station L are in their release position and a panel D is being manually loaded upon frame 212A. When the panel D is positioned upon the frame, the actuator drive 100A will be actuated to drive the actuator 70A to actuate the clamps on frame 212A to their panel clamping position. The conveyor system will then drive the pallets 200A-D on the conveyor loop 202, 204, 206 and 208 to advance the pallets one step in a counterclockwise direction around the loop to advance the pallet 200A to work station W1, to advance pallet 200B to work station W2, to advance pallet 200C to unloading station UL and to advance pallet 200D to loading station L.

At work station W1, one or more parts to be welded to the panel D may be temporarily placed in position upon the panel at that station, and upon the subsequent advancement of that panel to work station W2 a programmable robotic welder designated generally 220, supplied with a laser beam generated in a laser 222 and conducted to the welder by a beam diverting system designated generally 224, will be actuated to weld the part(s) in position on the panel. Upon the subsequent advancement of the panel from work station W2 to unloading station UL, the actuator drive 100B at unloading station UL will be actuated to release the clamps on the clamping frame to permit the panel to be unloaded.

In the case of a vehicle door production line, the line typically must be capable of processing at least three different forms of doors—a door for a two door vehicle and front and rear doors for a four door vehicle. (Right and left side doors normally will be handled on separate lines.) For each type of door, a different clamping frame is employed and pallets or carriers 200 carrying the various different types of clamping frames are stored on a storage loop including the line path 210 to be shuttled into and out of the active production loop constituted by the pallet path sections 202, 204, 206 and 208 as required. The robotic welder is capable of being programmed to perform the appropriate welds as required by each of the three different door styles.

Other forms of conveying systems may be employed, for example, where floor space is at a premium, overhead storage of the pallets may be employed with pallets being lifted from a conveyor line, conveyor loop or merry-go-round work table as required.

In order to be actuated by the actuator drives, it is necessary that all of the individual actuators for all of clamping frames be mounted at the same fixed location relative to the carrier so that alignment is achieved between the actuator drive and the actuator itself at the various stations on the conveying path. Normally, the actuators 70, 70A, 70B are most conveniently mounted upon the clamping frame to enable the various push-/pull cables to be connected between the actuator and the individual clamps before the clamping frame is mounted upon its carrier. However, the actuator 70, 70A or 70B may equally well be mounted upon the carrier itself.

While various embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

We claim:

1. In a workpiece handling system comprising a clamping frame, a plurality of releasable clamps mounted on said frame and operable to clamp a workpiece in a predetermined position upon said frame, power operable clamp actuating means for selectively locating said clamps in either of a workpiece clamping position or a workpiece release position accommodating movement of a workpiece to or from said predetermined position on said frame, and transfer means for transferring said frame along a transfer path extending from a workpiece loading station to a workpiece unloading station;

the improvement wherein said clamp actuating means comprises a plurality of elongate flexible push/pull cable means having first ends respectively coupled to said plurality of clamps for shifting said clamps from one of said clamping and release positions to the other of said clamping and release positions in response to pushing of said cable means and for shifting said clamps from said other of said positions to said one of said positions in response to pulling of said cable means, a common actuating means mounted on said frame and including an actuator member mounted for reciprocating movement along a fixed path relative to said frame and coupled to the respective other ends of said plurality of cable means to push said cable means in response to movement of said actuator member in one direction along said fixed path and to pull said cable means in response to movement of said actuator member in the other direction along said fixed path, screw means on said actuating means operable when rotated to drive said actuator member in movement along said fixed path, and reversible power drive means at each of said loading and unloading stations selectively engageable with said screw means to drive said screw means in rotation.

2. The invention defined in claim 1 wherein said actuating means comprises actuator housing means fixedly mounted on said frame for guiding said actuator member in straight line reciprocatory movement along said fixed path between opposite ends of said housing while restraining said actuator member against rotation, said screw means comprising an elongate screw rotatably mounted in said housing means with one end of said screw projecting from one end of said housing means, said screw being threadably received in said actuator member, and cooperable rotary coupling means engageable between said one end of said screw and said power drive means when said frame is located by said transfer means at either of a selected loading position at said loading station and a selected unloading position at said unloading station.

3. The invention defined in claim 2 wherein said actuator member includes means defining a centrally located threaded bore extending through said actuator member threadably receiving said screw, said other ends of said cable means being coupled to said actuator member at locations symmetrically spaced about the axis of said bore.

4. The invention defined in claim 3 wherein each of said cable means comprises a sheath fixedly secured at one end to said frame adjacent one of said clamps and fixedly secured at its other end to the end of said housing means opposite said one end of said housing means, an elongate wire slidably received in said sheath and projecting from both ends of said sheath, one end of said wire being operatively coupled to said one of said clamps, and means coupling the other end of said wire to said actuating member.

5. The invention defined in claim 4 wherein said means coupling said one end of said wire to said actuating member comprises means defining a smooth walled bore extending through said actuator member from one side of said actuator member to the other along an axis parallel to the axis of said threaded bore, an elongate rigid extension member slidably received in said smooth wall bore and projecting from opposite sides of said actuator member, abutment stops mounted at the opposite ends of said extension member defining opposite end limits of movement of said extension member relative to said actuator member, a compression spring mounted on said extension member between one of said abutment stops and the adjacent side of said actuating member, and means coupling said one end of said wire to one end of said extension member.

6. The invention defined in claim 5 wherein one of said abutment stops is threadably mounted on said extension member for adjustment lonitudinally of said member.

7. The invention defined in claim 6 wherein said compression spring is compressed between said one of said abutment stops and said adjacent side of said actuator member by a predetermined amount.

8. The invention defined in claim 6 wherein the relaxed length of said spring is such as to accommodate a predetermined amount of unrestricted sliding movement of said extension member relative to said actuator member.

9. A workpiece handling system comprising a plurality of workpiece carriers, transfer means for conveying said carriers in succession from a loading station at which a workpiece is loaded upon a carrier to each of a series of successive work stations at which work operations are performed upon the workpiece and thence to an unloading station at which the workpiece is unloaded from the carrier, a plurality of clamp means including a plurality of releasable clamps mounted on each of said carriers to cooperatively clamp a workpiece in a predetermined position on the carrier, each clamp including a clamp member movable between a release position accommodating movement of a workpiece to and from said predetermined position on said carrier and a workpiece clamping position, a plurality of elongate flexible push/pull cable means commonly connected to an actuator and extending from said actuator respectively to said plurality of clamps, said actuator including an actuator frame fixedly mounted on said carrier, an actuator member received in said actuator frame for reciprocatory movement relative to said frame, and an actuator member drive screw threadably coupled between said actuator frame and said actuator member for driving said actuator member in movement relative to said actuator frame in response to rotation of said drive screw, each of said push/pull cable means including an elongate sheath fixed at one end to said actuator frame and fixed at its other end to a location adjacent one of said movable clamp members and an elongate push/pull wire slidably received within and projecting outwardly from both opposite ends of said sheath, one end of the wire being coupled to said actuator member and the other end of the wire being coupled to said one of said movable clamp members to shift the clamp member toward its release position in response to movement of said actuator member in one direction and to shift the clamp member toward its clamping position in response to movement of said actuator in the opposite direction, and reversible rotary power means at each of said loading and unloading stations engageable with the drive screw on a carrier located at the loading or unloading station for driving said drive screw in rotation.

10. The invention defined in claim 9 wherein said plurality of workpiece carriers are of like construction, each of said clamp means comprising a clamping frame adapted to be detachably fixedly mounted upon one of said carriers, and said plurality of clamps are mounted at fixed locations on the clamping frame selected in accordance with the shape of the workpiece to be clamped to the clamping frame.

11. The invention defined in claim 10 wherein said actuator is mounted upon said carrier.

12. The invention defined in claim 10 wherein said actuator is mounted on said clamping frame.

13. The invention defined in claim 10 wherein the clamp frames mounted on a first group of said carriers each have a plurality of clamps located thereon to clamp a workpiece of a first shape and the clamp frames mounted on a second group of said carriers each have a plurality of clamps located thereon to clamp a workpiece of a second shape, said loading station, work stations and unloading station being spaced along a closed loop path traversed by carriers conveyed by said transfer means, said transfer means further comprising a storage section adapted to store at least one of said first and second groups of carriers to a location clear of said closed loop path and means for selectively transferring carriers from said storage section to said closed loop path and from said closed loop path to said storage section.

14. Article handling apparatus comprising an article support frame, conveying means for conveying said support frame to and from an article transfer position at a work station, a plurality of clamp members, each of said clamp members being mounted on said frame for movement between a clamping position wherein the clamp member is operable to clamp an article against said frame and a release position, wherein the clamp member is retracted to accommodate movement of the article into or out of engagement with said frame, said clamp members being mounted on said frame at locations such as to engage the article at selected locations around the periphery of the article to cooperatively clamp the article in a predetermined position upon said frame, a clamp actuator mounted on said frame including a housing fixedly mounted on said frame and an actuator member mounted in said housing for reciprocatory movement along an actuating axis fixed relative to said frame, a first end wall on said housing having a plurality of bores therethrough having bore axes parallel to said actuating axis, a plurality of flexible push/pull cable means extending from said first end wall respectively to said plurality of clamp members, each of said cable means including an elongate sheath fixedly secured at one end to said first end wall and fixedly secured at its opposite end to said frame adjacent a clamp member and an elongate wire of a length greater than that of its sheath slidably received within the sheath and projecting outwardly from both ends of its sheath, one end of each wire projecting from its sheath through one of said bores in said first end wall into said housing, a plurality of first means respectively coupling the one ends of the respective wires to said actuating member with each wire extending between said actuator member and said first end wall in parallel relationship to said actuating axis, the opposite end of each wire projecting from the opposite end of its sheath to the adjacent clamp member, a plurality of second means coupling the opposite ends of said wires to the respective adjacent clamp members to move the clamp member toward its clamping position when the wire is moved in one direction relative to its sheath and to move the clamp member toward its release position when the wire is moved in the opposite direction relative to its sheath, a drive screw mounted in said housing for rotation about a screw axis parallel to said actuating axis and threadably engaged with said actuating member to drive said actuating member in reciprocatory movement along said actuating axis in response to rotation of said screw, and reversible drive means at said work station engageable with said screw when said support frame is in said article transfer position for driving said screw in rotation.

15. The invention defined in claim 14 wherein said actuating member comprises a plate like member lying in a general plane normal to said actuating axis, each of said plurality of first means comprising an elongate coupling member fixedly secured to the one end of a wire and slidably projecting through a bore through said actuating member, a first and a second abutment member mounted on said coupling member at longitudinally spaced positions thereon at opposite sides of said actuating member, and a compression spring coaxially received on said coupling member between said first abutment member and said actuating member.

16. The invention defined in claim 15 wherein one of said first and second abutment members comprises a nut threadably received on said coupling member for threaded adjustment longitudinally of said coupling member.

17. The invention defined in claim 15 wherein the longitudinal distance between the first and second abutment members of at least one of said plurality of first means exceeds the sum of the relaxed length of the spring of that first means and the thickness of said abutment member by a preselected amount.

18. The invention defined in claim 14 wherein said housing defines a cylindrical chamber and said actuating member is a piston like member slidably received in said chamber with said actuating axis coaxial with the axis of said chamber, said first end wall defining one end of said chamber, a second end wall defining the opposite end of said chamber, means mounting said drive screw in said second end wall for rotation in fixed axial relationship to said housing, said screw extending coaxially of said chamber and said screw having one end projecting outwardly through said second end wall, and coupling means on said one end of said screw for rotatively coupling said screw to said reversible drive means.

19. The invention defined in claim 18 further comprising guide means in said housing restraining said actuating member against rotation about said actuating axis, said bores in said first end wall being symmetrically spaced about said actuating axis.

20. The invention defined in claim 14 wherein one end of said drive screw projects outwardly from said housing, and said drive means comprises drive shaft means rotatable about a shaft axis coaxially aligned with said screw axis when said support frame is in said transfer position, support means at said work station for moving said drive shaft means axially along said shaft axis between a retracted position axially spaced from said one end of said drive screw and a driving position, cooperating coupling means on said one end of said screw and said shaft means operable when said support frame is in said transfer position and said shaft means is in said driving position to rotatively couple said screw to said shaft means, and reversible power means at said work station for selectively locating said shaft means in said retracted position or said driving position.

* * * * *